US011313992B2

(12) United States Patent
Zilak

(10) Patent No.: US 11,313,992 B2
(45) Date of Patent: Apr. 26, 2022

(54) METHOD AND DEVICE FOR DETECTING OF ILLEGAL HIDING PLACES IN IRON ORE LOAD

(71) Applicants: Ondrej Zilak, Svatý Peter (SK); Marko Fulop, Bratislava (SK)

(72) Inventor: Ondrej Zilak, Svatý Peter (SK)

(73) Assignees: Ondrej Zilak, Svaty Peter (SK); Marko Fulop, Bratislava (SK)

( * ) Notice: Subject to any disclaimer, the term of this patent is extended or adjusted under 35 U.S.C. 154(b) by 0 days.

(21) Appl. No.: 17/049,053

(22) PCT Filed: May 9, 2019

(86) PCT No.: PCT/SK2019/050005
§ 371 (c)(1),
(2) Date: Oct. 20, 2020

(87) PCT Pub. No.: WO2019/216833
PCT Pub. Date: Nov. 14, 2019

(65) Prior Publication Data
US 2021/0239876 A1    Aug. 5, 2021

(30) Foreign Application Priority Data
May 11, 2018  (SK) .................. PUV 00083-2018

(51) Int. Cl.
| | | |
|---|---|---|
| *G01N 23/00* | (2006.01) | |
| *G01V 5/00* | (2006.01) | |
| *G01B 15/02* | (2006.01) | |
| *G01N 23/083* | (2018.01) | |

(52) U.S. Cl.
CPC ......... *G01V 5/0016* (2013.01); *G01B 15/025* (2013.01); *G01N 23/083* (2013.01)

(58) Field of Classification Search
CPC ... G01V 5/0016; G01B 15/025; G01N 23/083
See application file for complete search history.

(56) References Cited

U.S. PATENT DOCUMENTS 4,278,882 A  *  7/1981  Clayton ............... G01N 23/222
                                                    250/255
5,333,493 A  *  8/1994  Cutmore ................ G01N 22/04
                                                    324/640

(Continued)

OTHER PUBLICATIONS

Written Opinion of the International Searching Authority; Application No. PCT/SK2019/050005; Completed: Jul. 17, 2019; dated Jul. 25, 2019; 10 Pages.

*Primary Examiner* — Kiho Kim
(74) *Attorney, Agent, or Firm* — Whitmyer IP Group LLC

(57) ABSTRACT

A method and device construction for detecting of hiding places with smuggled materials in the extremely heavy railway loads transporting iron ore by the means of neutron beam are disclosed. Upon the scanning of the iron ore load with neutrons the searched cavities or leaden containers with contraband are expressed by reducing of the flow of passing neutrons. The outline width of the scanned load is measured by dimension detectors. Values of differences between the scanned widths of the load and the outline widths are measures of the cavity dimensions with smuggled materials and said measures are included into the neutron radiographic image.

5 Claims, 1 Drawing Sheet

(56) References Cited

U.S. PATENT DOCUMENTS

| | | | |
|---|---|---|---|
| 6,137,294 A | * | 10/2000 | Best .................. G01N 9/24 324/640 |
| 6,542,580 B1 | | 4/2003 | Carver et al. |
| 2009/0290757 A1 | | 11/2009 | Mian et al. |
| 2016/0178790 A1 | | 6/2016 | Li et al. |
| 2018/0017702 A1 | | 1/2018 | Bendahan et al. |

* cited by examiner

METHOD AND DEVICE FOR DETECTING OF ILLEGAL HIDING PLACES IN IRON ORE LOAD

TECHNICAL FIELD

The present teaching relates to the method for detecting of illegal hiding places for cigarettes, and the like, in the railway iron ore load by the scanning of neutron radiation during customs control of goods. The present teaching relates to the field of scanning techniques.

BACKGROUND

Presently used modern scanners for non-destructive control of various loads transported in the railway trains use x-scanners (electron accelerators converting electron energy to bremsstrahlung).

Penetrability of these scanners is limited to 40 cm of the equivalent iron width. X-scanners fail in case of extremely heavy bulky loads, such as iron ore (specific weight higher than 3 $g/cm^{-3}$) hiding packages of smuggled materials, and increasing of their penetration through the searched material by increasing of x-radiation energy over 10 MeV is not possible due to the radiation protection of persons and environment against ionization radiation. Technologies using neutron radiation relate to the activation of radionuclides irradiated by neutrons in the smuggled materials, by which neutrons the smuggled materials are detected. Neutron scanners often use the method of neutron activation analysis for the control of illegal smuggled materials, when characteristic gamma radiation arising upon reactions of neutrons with the nuclei of the elements of the controlled material is detected. However, when the extremely heavy and bulky loads, such as container or wagon with iron ore, are controlled, even this characteristic gamma radiation is not able to get through the load.

Said insufficiencies partly or fully provided a possibility to solve the problem by appropriate technical means. It resulted in the below described method for detecting of illegal hiding places in iron ore load and the device according to the present teaching.

SUMMARY

The above insufficiencies are substantially remedied by the method for detecting of illegal hiding places in iron ore load according to the present teaching, when a scanner with penetrating energetic neutron beams employing the method of neutron beam attenuation due to the passing through extremely heavy load layer is used. The subject matter of the method for detecting of illegal hiding places in the iron ore load resides in irradiating of the iron ore load from the top position, which irradiation consists of the scanning neutron beam emitted from a neutron generator having energy from 14 MeV to 17 MeV. Afterwards the set of neutron detectors—positioned at the ground level across the width of the wagon with iron ore load, measure the value of the neutron flow density reduction after passing of the neutrons through the scanned layer of the iron ore load. The true width of the scanned iron ore load is determined on the basis of the measured value of the neutron flow density reduction. Also, the set of distance detectors—positioned over the wagon, measures the apparent outline layer width at the site of the iron ore load under the scanning beam of neutron radiation. Subsequently the statistic difference between the apparent outline width of the scanned iron ore load layer and the real width of the scanned iron ore load indicates the presence of a cavity, which cavity is displayed in neutron radiographic imaging on the basis of the difference of the apparent and real widths along the area of the scanned surface of the iron ore load.

The method for detecting illegal hiding places in the iron ore load is more precise, if data about the chemical composition, specific weight of the iron ore and/or irradiation geometry of the current scanning site of the iron ore load, the position of the neutron detectors, and the speed of the movement of the scanned iron ore load are considered upon determining the real width of the scanned iron ore load. Data about the chemical composition of the iron ore can be preferably supplemented with data about humidity of the iron ore load measured by a device for measurement of the iron ore load humidity. Cavities formed by smuggled packages in the scanned extremely heavy load reduce the penetrating neutrons less, and more intensive neutron beam penetrates through the load in such locations.

According to the real conditions the scanning neutron irradiation beam emitted from the neutron generator is collimated by a collimator.

As construction version of the device—a neutron scanner for performing of the method for detecting of illegal hiding places in extremely heavy loads, the subject matter of the present teaching resides in the device consisting of the neutron generator with energy from about 14 MeV to 17 MeV, and the neutron beam collimator positioned over the wagon level, while the set of neutron detectors is positions at the ground level, across the width of the wagon in the angle of vision of the neutron beam. The set of distance detectors is present for the visualization of the unevenness of the scanned iron ore load surface, which set is positioned over a wagon with the scanned iron ore load across the wagon width. Neutrons with energy of about 14 MeV have sufficient energy to penetrate through extremely heavy iron ore load with width more than 130 cm. The width of railway wagon transporting the iron ore is more than 270 cm, and therefore it is difficult for energetic neutron beam to penetrate it in case of scanning at side geometry. Regular load bearing capacity of a freight wagon is about 70 tons. It enables its loading with the iron ore up to average width of 130 cm. Such load width is well penetrable with neutron having energy of 14 MeV produced by the neutron generator. This is the reason why a vertical neutron beam scanning the iron ore load in its thinnest width profile was selected.

The device for detecting of illegal hiding places in the iron ore load can be made more sophisticated, if a device for measurement of the iron ore load humidity is positioned over the wagon with the scanned iron ore load.

The advantages of the method for detecting of illegal hiding places in the iron ore load and the device for the present teaching are obvious from their external effects. In general it can be stated that the originality of the proposed solution resides in the resolution of the scanner, speed of the loaded wagon movement under the scanner, and compliance with the requirements for radiation protection of staff and other persons, including environmental radiation protection.

BRIEF DESCRIPTION OF THE DRAWINGS

The method for detecting of illegal hiding places in the iron ore load and the device according to the present teaching will be further illustrated on drawings, where.

DETAILED DESCRIPTION

It is to be understood that the individual invention embodiments are presented only as illustration, rather than for the limitation of the technical solutions. For skilled persons it would cause no problem to design optimal construction and to select its elements, and therefore these elements were not addressed in further details.

EXAMPLE 1

Figure 1:
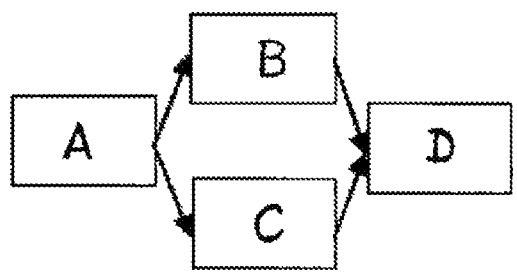
FIG. 1 illustrates the block scheme for the scanning of the extremely heavy railway loads by neutron radiation.

In this example of the specific embodiment of the subject matter of the present teaching a method for detecting of illegal hiding places in the iron ore load, as schematically shown at FIG. 1, consists of the following steps:

A) the iron ore load 6 is irradiated from the upper position with the scanning beam of neutron radiation emitted from the neutron generator 1 with energy of at least 14 MeV;

B) the set of neutron detectors 7 positioned at the ground level across the width of the wagon with iron ore load 6 measure the value of the neutron flow density reduction after passing of the neutrons through the scanned layer of iron ore load 6; the true width of the scanned iron ore load 6 is determined on the basis of the measured value of the neutron flow density reduction, while the determination of the real width of the scanned iron ore load 6 considers data about the chemical composition of the iron ore 6 and/or the geometry of the current irradiation site of the scanned iron ore load 6, and the neutron detectors 7 position, and data about the humidity of the iron ore load 6 measured by the device 10 for the measurement of the iron ore load 6 humidity;

C) the set of distance detectors 8 positioned over the wagon measures the apparent outline layer width 11 at the site of the iron ore load 6 under the scanning beam of neutron radiation;

D) the statistic difference between the values of apparent outline layer 11 width of the scanned iron ore load 6 and the real width of the scanned iron ore load 6 indicates the presence of the cavity 9; the differences between the apparent and real widths long the area of the scanned surface of the iron ore load 6 are displayed as neutron radiographic imaging.

Figure 3:
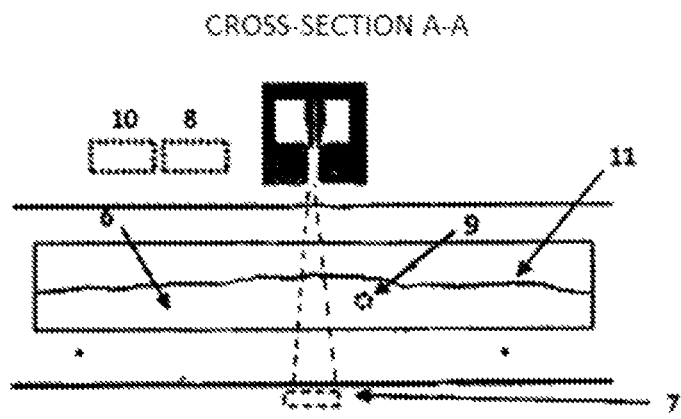
FIG. 3 illustrates the construction of the device for custom control of the railway iron ore loads by the neutron scanner in longitudinal section of the railway wagon having other shape of the neutron radiation beam.

According to the real conditions the scanning neutron irradiation beam emitted for the neutron generator is collimated by a collimator 5 as shown also on FIG. 3.

EXAMPLE 2

Figure 2:
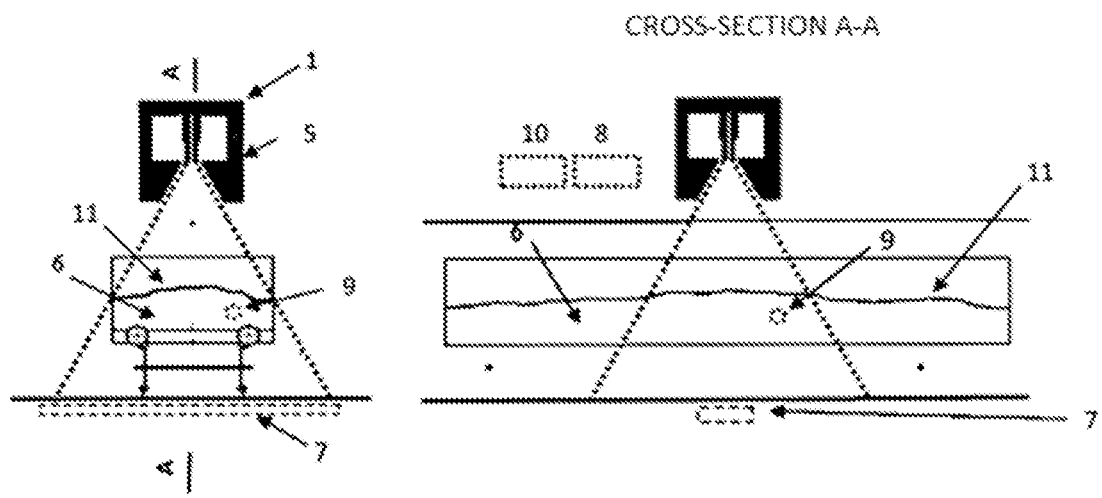
FIG. 2 illustrates the construction of the device for custom control of the railway iron ore loads by the neutron scanner with both transverse and longitudinal sections of the railway wagon having the iron ore load.

In this example of the specific embodiment of the subject matter of the present teaching, a device for detecting of illegal hiding places in the iron ore load, as illustrated at FIG. 2, is disclosed. The device for detecting of illegal hiding places in the iron ore load consists of the neutron generator 1 having energy of at least 14 MeV with the neutron beam collimator 5 positioned over the wagon level, while the set of neutron detectors 7 is positioned at the ground level, across the width of the wagon in the visual field of the neutron beam. Further it consists of the set of dimension detectors 8 positioned over the wagon with the scanned iron ore load 6 across the wagon width. Finally, the device 10 for measurement of the iron ore load 6 humidity is positioned over the scanned iron ore load 6.

According to the real condition the device consists of the neutron generator 1 having energy of 16 MeV.

INDUSTRIAL APPLICABILITY

The industrial applicability of the method for detecting of illegal hiding places in the iron ore load and the devices according to the present teaching resides particularly in their using in custom houses for detecting, identification and specification of the illegal hiding places of contrabands in extremely heavy and big loads, such as the iron ore load in wagons.

The invention claimed is:

1. A method for detecting illegal hiding places in an iron ore load, comprising:
   irradiating an iron ore load from an upper position with a scanning beam of neutron radiation emitted from a neutron generator with energy from 14 MeV to 17 MeV,
   positioning a set of neutron detectors at ground level across a width of a wagon with the iron ore load to measure a value of neutron flow density reduction after passing of neutrons through the scanned layer of iron ore load,
   determining a true thickness of the scanned iron ore load on the basis of the measured value of the neutron flow density reduction,
   positioning a set of distance detectors over the wagon to measure an apparent outline layer thickness at a site of the iron ore load under the scanning beam of neutron radiation,
   wherein a statistic difference between values of the apparent outline layer thickness of the scanned iron ore load and the true thickness of the scanned iron ore load indicates the presence of a cavity,
   differences between the apparent thickness and true thickness along the area of the scanned surface of the iron ore load are displayed as neutron radiographic imaging.

2. The method according to claim 1, wherein the scanning beam of neutron radiation emitted from neutron generator is collimated by the collimator.

3. The method according to claim 1, wherein data about the chemical composition of the iron ore and/or radiation geometry of the current scan of the iron ore load and the neutron detectors position are considered upon determining of the true thickness of the scanned iron ore load.

4. The method according to claim 1, wherein data about the chemical composition of the iron ore is supplemented with data about iron ore load humidity.

5. A device for detecting illegal hiding places in an iron ore load, comprising:
   a neutron generator with a neutron beam collimator positioned over a wagon with the iron ore load,
   a set of neutron detectors positioned at a ground level, across a width of the wagon in a visual field of the neutron beam,
   a set of dimension detectors positioned over the wagon with the scanned iron ore load across the wagon width.

* * * * *